(12) United States Patent
Ahunai et al.

(10) Patent No.: US 11,926,238 B2
(45) Date of Patent: Mar. 12, 2024

(54) APPARATUS, SYSTEM AND METHOD FOR CHARGING A BATTERY

(71) Applicant: MINE MOBILITY RESEARCH CO., LTD., Bangkok (TH)

(72) Inventors: Somphote Ahunai, Bangkok (TH); Wen Wu Pan, Shenzhen (CN); Cao Kai Zheng, Shenzhen (CN); Gang Liu, Shenzhen (CN); Jian Hua Li, Shenzhen (CN); Xiao Meng Deng, Shenzhen (CN); Zhao Hui Peng, Shenzhen (CN)

(73) Assignee: MINE MOBILITY RESEARCH CO., LTD., Bangkok (TH)

( * ) Notice: Subject to any disclaimer, the term of this patent is extended or adjusted under 35 U.S.C. 154(b) by 273 days.

(21) Appl. No.: 17/629,072

(22) PCT Filed: Mar. 11, 2020

(86) PCT No.: PCT/TH2020/000014
§ 371 (c)(1),
(2) Date: Jan. 21, 2022

(87) PCT Pub. No.: WO2021/025629
PCT Pub. Date: Feb. 11, 2021

(65) Prior Publication Data
US 2022/0274502 A1     Sep. 1, 2022

(30) Foreign Application Priority Data
Aug. 2, 2019  (CN) .......................... 201910711196.8

(51) Int. Cl.
*B60L 53/66* (2019.01)
*B60L 53/30* (2019.01)
(Continued)

(52) U.S. Cl.
CPC ............. *B60L 53/66* (2019.02); *B60L 53/305* (2019.02); *B60L 53/65* (2019.02); *G06F 21/606* (2013.01)

(58) Field of Classification Search
CPC ......... B60L 53/66; B60L 53/305; B60L 53/65
See application file for complete search history.

(56) References Cited

U.S. PATENT DOCUMENTS

2013/0069589 A1* 3/2013 Kai .......................... B60L 53/66
320/109
2015/0008888 A1 1/2015 Chevalley et al.
(Continued)

FOREIGN PATENT DOCUMENTS

CN   104022547 A    9/2014
CN   106160054 A   11/2016
(Continued)

OTHER PUBLICATIONS

Machine translation of KR-20180116031-A (Year: 2023).*
(Continued)

*Primary Examiner* — David V Henze-Gongola
(74) *Attorney, Agent, or Firm* — JCIP; Joseph G. Chu; Jeremy I. Maynard

(57) ABSTRACT

Disclosed is an apparatus for charging a battery comprising a first charging device configured to communicate with at least one second charging device, the first charging device and the at least one second charging device configured to charge the battery, and comprising a first controller configured to control the first charging device, wherein the first controller determines the number of the at least one second charging devices by communicating with a second controller.

19 Claims, 10 Drawing Sheets

(51) Int. Cl.
    *B60L 53/65*     (2019.01)
    *G06F 21/60*     (2013.01)

(56) References Cited

U.S. PATENT DOCUMENTS

| | | |
|---|---|---|
| 2017/0043676 A1 | 2/2017 | Littrell |
| 2018/0069406 A1 | 3/2018 | Solomon et al. |

FOREIGN PATENT DOCUMENTS

| | | | |
|---|---|---|---|
| CN | 106853779 A | | 6/2017 |
| CN | 108054746 A | | 5/2018 |
| CN | 109760545 A | | 5/2019 |
| JP | 2008035665 A | | 2/2008 |
| KR | 20180116031 A | * | 10/2018 |
| WO | 2014045666 A1 | | 3/2014 |

OTHER PUBLICATIONS

Decision to Grant a Patent dated Feb. 22, 2023 for Japanese Patent Application No. 2022-506746.
International Search Report and Written Opinion of International Searching Authority for International Application No. PCT/TH2020/000014.
International Preliminary Report on Patentability for International Application No. PCT/TH2020/000014.

* cited by examiner

APPARATUS, SYSTEM AND METHOD FOR CHARGING A BATTERY

FIELD OF THE INVENTION

The present disclosure relates to an apparatus, a system and a method for charging an electric vehicle having a battery.

BACKGROUND ART

The following discussion of the background to the disclosure is intended to facilitate an understanding of the present disclosure only. It should be appreciated that the discussion is not an acknowledgement or admission that any of the material referred to was published, known or part of the common general knowledge of the person skilled in the art in any jurisdiction as at the priority date of the disclosure.

Charging stations including at least one charging pile for charging a battery of an electric vehicle have been proposed. In the case where the electric vehicle requires relatively higher power to drive, the electric vehicle may include multiple charging sockets or ports. Each of the sockets of the electric vehicle is connected to a Power Line Communication (PLC) module for power line communication with a charging pile. Therefore, an electric vehicle having multiple charging sockets will have a corresponding number of PLC modules. Such a configuration complicates charging logic and fault handling of a charging station connected to the multiple sockets of the electric vehicle. As a result, failure rate of the charging station is high and reliability of the charging station is low. A large number of PLC modules also adds to the cost of the electric vehicle. There exists a need to alleviate at least some of the aforementioned problems.

SUMMARY

The present disclosure seeks to address and/or ameliorate the problem in the prior art by providing an apparatus, a system and a method for charging a battery.

Throughout this document, unless otherwise indicated to the contrary, the terms 'comprising', 'consisting of', 'having' and the like, are to be construed as non-exhaustive, or in other words, as meaning 'including, but not limited to'.

Furthermore, throughout the document, unless the context requires otherwise, the word 'include' or variations such as 'includes' or 'including' will be understood to imply the inclusion of a stated integer or group of integers but not the exclusion of any other integer or group of integers.

According to one aspect of the disclosure, an apparatus for charging a battery, comprising a first charging device configured to communicate with at least one second charging device, the first charging device and the at least one second charging device configured to charge the battery; and comprising a first controller configured to control the first charging device, wherein the first controller determines the number of the at least one second charging devices by communicating with a second controller.

In some embodiments, when the first controller receives data including a first power data to charge the battery, and determines a second power data based on the number of the at least one second charging devices, the second power data used for each of the at least one second charging device.

In some embodiments, the first charging device comprises a charging member for interfacing with a plurality of sockets, wherein the charging member is configured to be inserted into at least one corresponding socket of an electrical apparatus.

In some embodiments, the second power data is derived or calculated by dividing the first power data by the number of the at least one second charging devices.

In some embodiments, in the case where the second power data exceeds a power threshold value, the first controller sets the second power data to the power threshold value.

In some embodiments, the electric apparatus is an electric boat, an electric ferry, an electric car, or an electric truck.

In some embodiments, a communication between the apparatus and the electric apparatus is performed by a Power Line Communication (PLC).

In some embodiments, a communication between the first charging device and the at least one second charging device is performed by a Controller Area Network (CAN) communication.

According to one aspect of the disclosure, a system comprises an apparatus and a server configured to communicate with at least one of the plurality of charging devices and to store data provided from at least one of the plurality of charging devices.

According to one aspect of the disclosure, a system comprises an apparatus and a device configured to communicate with at least one of the plurality of charging devices and to authenticate a user.

According to one aspect of the disclosure, a system comprises an apparatus, wherein the apparatus further comprises the at least one second charging device.

According to one aspect of the disclosure, a system comprises an apparatus and the electric apparatus.

According to one aspect of the disclosure, a method for charging a battery, comprising the steps of: communicating with at least one second charging device by a first charging device, the first charging device and the at least one second charging device configured to charge the battery; and controlling the first charging device by a first controller; determining, by the first controller, the number of the at least one second charging devices by communicating with a second controller.

According to an aspect of the present disclosure, there is provided a system for charging an electric vehicle. The system includes multiple charging devices. Each of the charging devices is operable to establish communication with the electric vehicle via a respective charging port of the electric vehicle to identify a charging device among the charging devices via which charging requirements of the electric vehicle is to be received and allocated among the plurality of charging devices that are available for charging the electric vehicle.

In some embodiments, each charging device is operable to establish communication with the electric vehicle by exchanging handshake signals therewith.

In some embodiments, the multiple charging devices includes a first charging device and one or more second charging devices in data communication with the first charging device. The first charging device is a charging device that successfully exchanges handshake signals with the electric vehicle and is identified for receiving the charging requirements of the electric vehicle. The second charging devices is a charging device that unsuccessfully exchanges handshake signals with the electric vehicle and indicates that it is available for charging the electric vehicle.

In some embodiments, each second charging device indicates that it is available for charging the electric vehicle by sending a message including its charging device identity (ID) to the first charging device, and the first charging device maintains a record of charging device IDs that it receives.

In some embodiments, charging devices that are available for charging includes charging devices that further pass an insulation detection test. In some embodiments, the first charging device instructs the one or more second charging devices to perform the insulation detection test.

In some embodiments, charging devices that are available for charging includes charging devices that are further ready for charging.

In some embodiments, the first charging device is further operable to determine average charging requirements for each charging device that is available for charging. In some embodiments, charging requirements for a charging device is set to a maximum charging capacity associated with the charging device if the average charging requirements exceeds the maximum charging capacity.

In some embodiments, a charging device is determined to be no longer available for charging the electric vehicle if the average charging requirements is lower than a minimum charging capacity associated with the charging device. And in these embodiments, the first charging device determines new average charging requirements for charging devices that are still available for charging if a charging device is determined to be no longer available for charging.

According to an aspect of the present disclosure, there is provided a method for charging an electric vehicle via a plurality of charging devices. The method includes each of the plurality of charging devices establishing communication with the electric vehicle via a respective charging port of the electric vehicle, and identifying a first charging device among the plurality of charging devices that successfully establishes communication with the electric vehicle for receiving charging requirements of the electric vehicle. The method further includes receiving charging requirements of the electric vehicle via the first charging device, allocating the charging requirements among charging devices that are available for charging; and charging the electric vehicle via the available charging devices based on respective allocated charging requirements.

In some embodiments, establishing communication includes exchanging handshake signals.

In some embodiments, each charging device that unsuccessfully establishes communication with the electric vehicle indicates that it is available for charging the electric vehicle.

In some embodiments, charging devices that are available for charging includes charging devices that further pass an insulation detection test.

In some embodiments, charging devices that are available for charging includes charging devices that are further ready for charging.

In some embodiments, allocating the charging requirements among the charging devices that are available for charging includes determining average charging requirements for each charging device that is available for charging.

In some embodiments, charging requirements for a charging device is set to a maximum charging capacity associated with the charging device if the average charging requirements exceed the maximum charging capacity.

In some embodiments, a charging device is determined to be no longer available for charging the electric vehicle if the average charging requirements is lower than a minimum charging capacity associated with the charging device. In these embodiments, the method further includes determining new average charging requirements for charging devices that are still available for charging if any charging device is determined to be no longer available for charging.

According to an aspect of the present disclosure, there is provided an electric vehicle that includes a battery and multiple charging ports for charging the battery. At least one of the charging ports does not include a communication module associated therewith for exchanging handshake signals with a charging device.

In some embodiments, only one of the charging ports has a communication module associated therewith.

In some embodiments, the electric vehicle is configured to send charging requirements of the battery to a charging device via the charging port having a communication module associated therewith.

In some embodiments, the battery is configured to be chargeable with each of the charging ports receiving a fraction of the charging requirements.

In some embodiments, the communication module is a power line communication (PLC) communication module.

BRIEF DESCRIPTION OF THE DRAWINGS

Various embodiments are described, by way of example only, with reference to the accompanying drawings, in which.

DETAILED DESCRIPTION

The present disclosure may be suited for an apparatus, a system and a method for charging a battery.

Unless defined otherwise, all other technical and scientific terms used herein have the same meaning as is commonly understood by a skilled person to which the subject matter herein belongs.

System 1000

Figure 1:
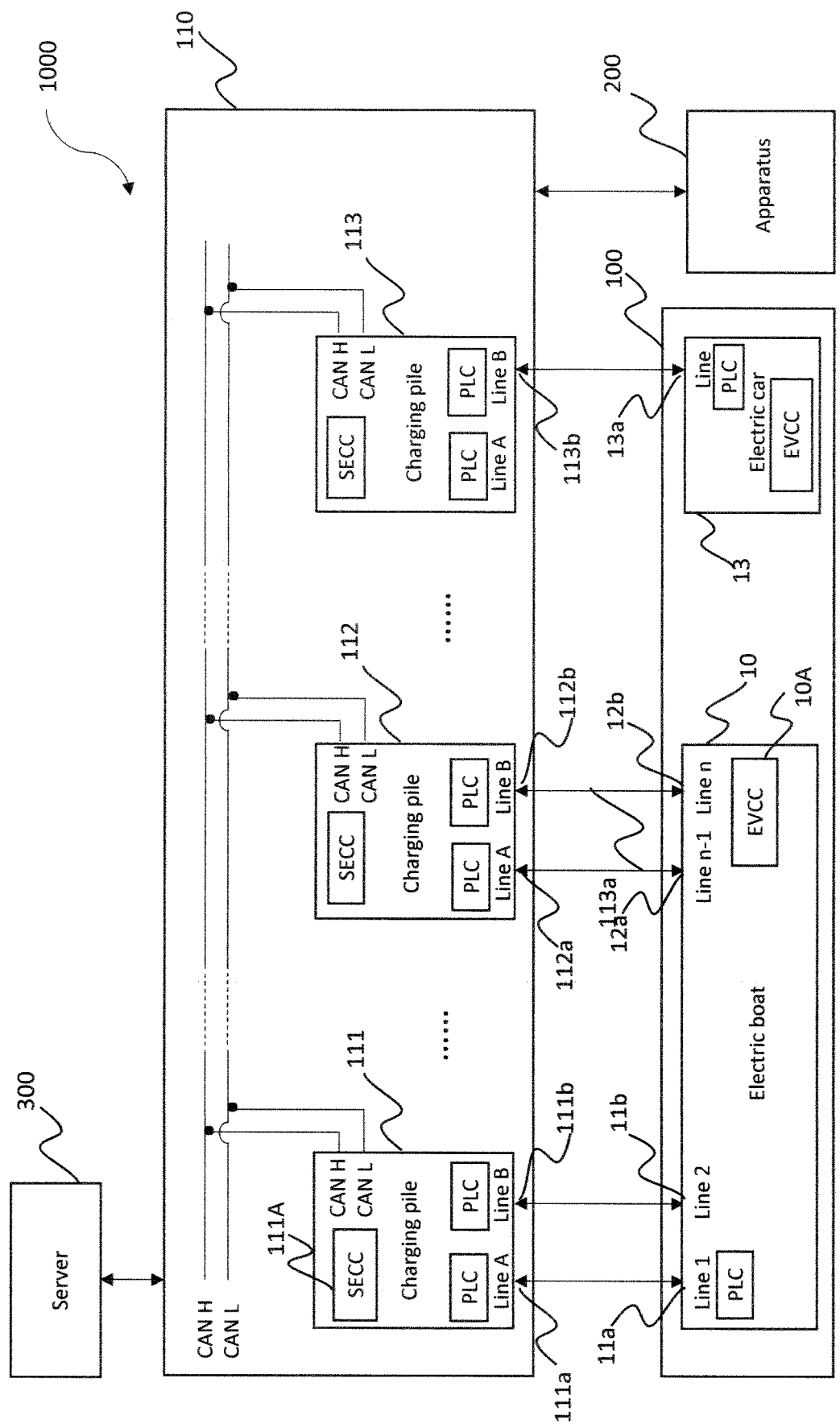
FIG. 1 illustrates a system 1000 including a charging station having a number of charging piles according to some embodiments of the present disclosure.

As shown in FIG. 1, a system 1000 for charging an electric vehicle 10, 13 includes a server 300, a charging station (or charging apparatus) 110 and an apparatus 200. The charging station 110 is in data communication with the server 300. The apparatus 200 is in data communication with the charging station 110. The charging station 110 includes a first charging pile 111, a second charging pile 112, and a third charging pile 113, all of which are connected to a controller area network. The charging piles 111, 112, 113. may also be known as charging devices 111, 112, 113. The system is shown in FIG. 1 connected to a first electric vehicle 10, such as an electric boat 10, and a second electric vehicle 13, such as an electric car 13 for charging them. Hereinafter, the electric boat 10 and the electric car 13 may each be referred to as an electric apparatus 100 as well.

Electric Apparatus 100

The electric boat 10 includes multiple charging ports 11a, 11b, 12a, 12b, for parallel charging the electric boat 10, or more specifically for parallel charging a battery (not shown) of the electric boat 10. Each charging port 11a, 11b, 12a, 12b, is capable of receiving a corresponding charging member (not shown) of the charging piles 111, 112. Each charging port 11a, 11b, 12a, 12b, is shaped and dimensioned for allowing a charging member (not shown) of a charging pile 111, 112, 113 to be inserted therein. The electric boat 10 includes a second controller 10A for controlling various mechanisms and operations of the electric boat 10. Each charging port 11a, 11b, 12a, and 12b may be a socket. The electric car 13 includes one charging port 13a for receiving a charging member of the third charging pile 113. The charging port 13a of the electric car 13 may also be a socket. Hereinafter, the electric boat 10, as a non-limiting example of the electric apparatus 100, will be described below. A first charging port 11a of the electric boat 10 has a PLC module associated therewith for data communication with the charging station 110, or more specifically with the charging pile 111 of the charging station 110. In other words, the first charging port 11a of the electric boat 10 has a PLC module connected thereto for facilitating communication between the electric boat 10 and the charging station 110. The second controller 10A of the electric boat 10 may be an electric vehicle communication controller (EVCC) 10A.

It is to be appreciated that the number of charging ports 11a, 11b, 12a, 12b the electric boat 10 has is not limited to the four charging ports 11a, 11b. 12a, 12b shown in FIG. 1; the electric boat 10 may include more or less than four charging ports 11a, 11b, 12a, 12b. It is to be appreciated that the number of the charging piles 111, 112 is not limited to the three charging piles 111, 112, 113 shown in FIG. 1; the charging station 110 may include any number of charging piles 111, 112, 113. The electric apparatus 100 is not limited to an electric boat 10 and an electric car 13 but may include other electric vehicles such as, but not limited to, an electric ferry (E-Ferry), electric truck (E-truck), etc. Hereinafter, the charging station 110 may also be referred to as a charging apparatus 110.

Charging Apparatus 110

As shown in FIG. 1, each of the charging piles 111, 112, 113 includes respective first controllers 111A, 112A, 113A, first charging connectors 111a, 112a, 113a and second charging connectors 111b, 112b, 113b. Each charging connector 111a, 111b, 112a, 112b, 113a, 113b has a PLC module connected thereto. As mentioned previously, the charging piles 111, 112, 113 are connected with one another via the controller area network (CAN). The charging apparatus 110 may include an Electric Vehicle (EV) supply equipment (EVSE) or an EV charger. The first controller 111A may include a communication controller of the EV supply equipment, commonly known as a supply equipment communication controller (SECC). Each SECC 111A, 112A, 113A is able to communicate with the EVCC 10A of the electric boat 10 via power line communication using respective PLC modules.

Each charging pile 111, 112, 113 further includes a first charging member and second charging member (both not shown) coupled to the first connector 111a, 112a, 113a and the second connector 111b, 112b, 113b respectively. Each charging member is inserted into a charging port 11a, 11b, 12a, 12b of the electric boat 10 for charging of the electric boat 10.

Once a charging member of a charging pile 111, 112, 113 is inserted into a charging port 11a, 11b, 12a, 12b of the electric boat 10, the charging pile 111, 112, 113 may determine whether the charging port of the electric boat 10 receiving the charging member is equipped with a PLC module or not by establishing communication with the electric boat 10. If the charging pile 111, 112, 113 succeeds in establishing communication with the electric boat 10, the charging pile 111, 112, 113 will know that the charging port 11a, 11b, 12a, 12b to which it is connected has a PLC module connected therewith to allow the communication. On the other hand, if the charging pile 111, 112, 113 fails to establish communication with the electric boat 10, the charging pile 111, 112, 113 will assume that the charging port 11a, 11b, 12a, 12b to which it is connected does not include any PLC module.

Hereinafter, a charging pile 111, 112, 113 that is connected to a charging port 11a, 11b, 12a, 12b equipped with a PLC module of the electric boat 10 is referred to as a master charging pile or host charging pile. And a charging pile 111, 112, 113 that is connected to a port 11a, 11b, 12a, 12b not equipped with a PLC module is referred to as a slave charging pile.

To charge the electric boat 10, at least one of the charging piles 111, 112, 113 must be connected to the charging port 11a, 11b, 12a, 12b of the electric boat 10 that is equipped with a PLC module. Then, the sequence of steps shown in FIG. 3 will be initiated to check the readiness of charging piles 111, 112, 113 for charging.

The first controller 111A, 112A, 113A may be disposed in the charging pile 111, 112, 113 or separately disposed from the charging pile 111, 112, 113. The first controller 111A, 112A, 113A may perform at least one process shown in FIGS. 3, 4, 5.

Apparatus 200

The apparatus 200 may include a personal computer, a mobile phone, a tablet, or the like, and may be configured to have an application such as a mobile Application (App), Radio-frequency identification (RFID), and/or a plug for connecting the apparatus 200 to a charging pile 111, 112, 113 of the charging apparatus 110. A user may obtain information from the electric apparatus 100 and/or the charging pile 111, 112, 113 of the charging apparatus 110 via the apparatus 200.

Server 300

As shown in FIG. 1, the server 300 (backoffice server) may be configured to store data transmitted from the charging pile 111, 112, 113 of the charging apparatus 110. The communication between the charging pile 111, 112, 113 and the server 300 may use an open charge point protocol (OCPP). The OCPP may be an open and common protocol for the communication. The communication may be a wireless communication or a wired communication.

An Exemplary Flowchart of Steps Performed by the System 1000

Figure 2:
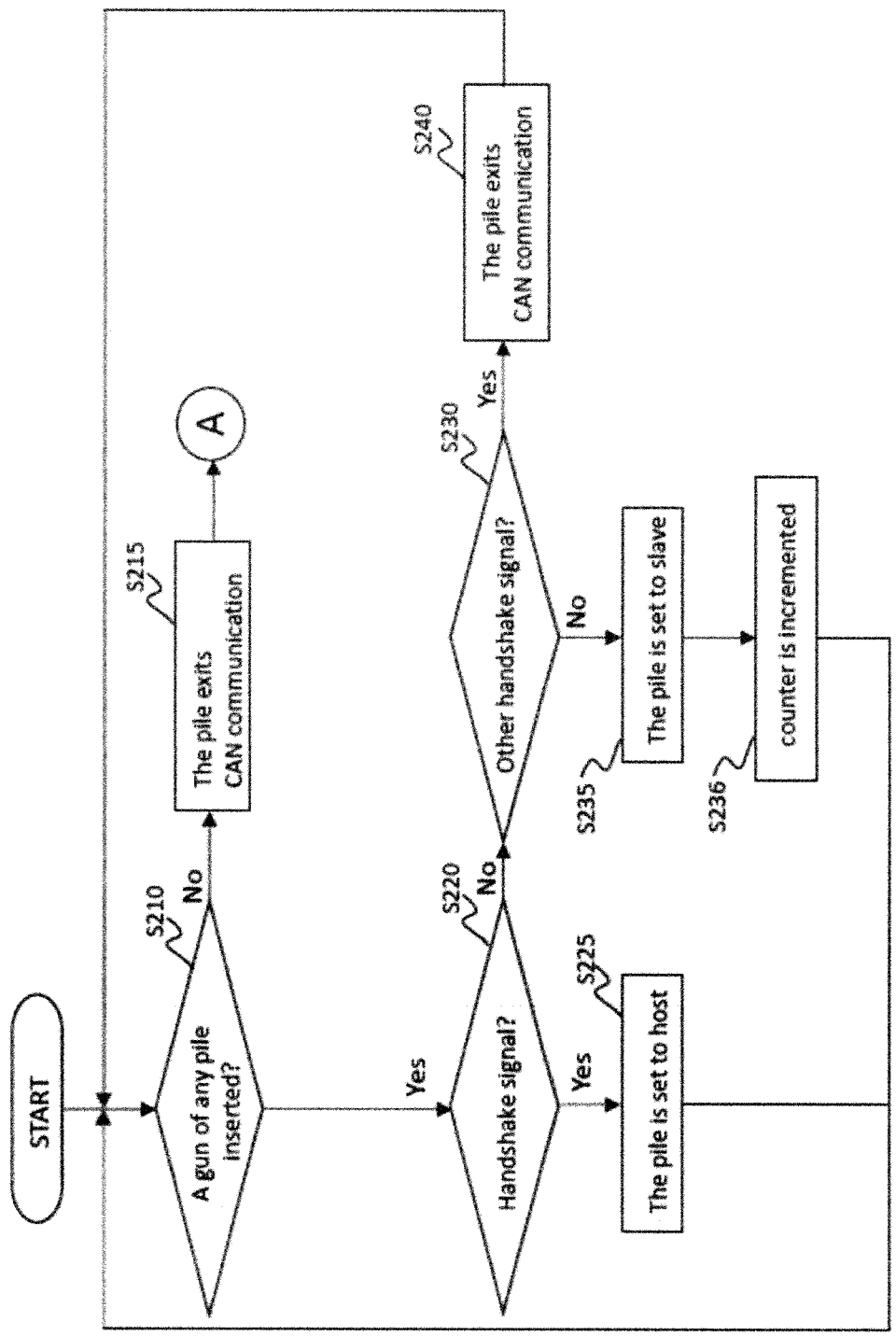
FIG. 2 illustrates a method or process for determining a master charging pile and at least one slave charging pile according to some embodiments of the present disclosure.

FIG. 2 illustrates a method for determining a master charging pile 111 and at least one slave charging pile 112 according to some embodiments of the present disclosure.

As shown in FIG. 2, the first controller 111A determines whether the charging member of a charging pile 111, 112 is inserted into a socket 11*a*, 11*b*, 12*a*, 12*b* of the electric boat 10 at S210. If properly inserted (i.e. 'Yes') at S210, the process proceeds to S220. If not properly inserted (i.e. 'No') at S210, the first controller 111A controls the charging pile 111, 112 so that the charging pile 111, 112 exits the Controller Area Network (CAN) communication at S215. Upon completion of the step S215, the process proceeds to the step S310 shown in FIG. 3.

At S220, the first controller 111A determines whether a handshake signal is transmitted from the electric boat 10 to the charging pile 111, 112. If properly transmitted (i.e. 'Yes') at S220, the charging pile 111, 112 is set as a host charging pile at S225, and the process may subsequently proceed to S210. If not properly transmitted (i.e. 'No') at S220, the process proceeds to S230 The host charging pile may also be referred to as a master charging pile.

At S230, the first controller 111A determines whether other handshake signal is transmitted from the electric boat 10 to the charging pile 111, 112. The other handshake signal may be a signal from an apparatus 100 other than the electric boat 10. If properly transmitted (i.e. 'Yes') at S230, the charging pile exits CAN communication at S240 and the process returns to S210. If not properly transmitted (i.e. 'No') at S230, the charging pile is set as a slave charging pile at S235 and a counter for counting the number of slave charging piles 111, 112 is incremented at S236, and the process subsequently returns to S210.

Hereinafter, it is assumed that the charging pile 111 is a host charging pile 111 and the charging pile 112 is a slave charging pile 112. Hereinafter, the host charging pile 111 may be simply referred to as a host 111 and the slave charging pile 112 may be simply referred to as a slave 112.

Figure 3:
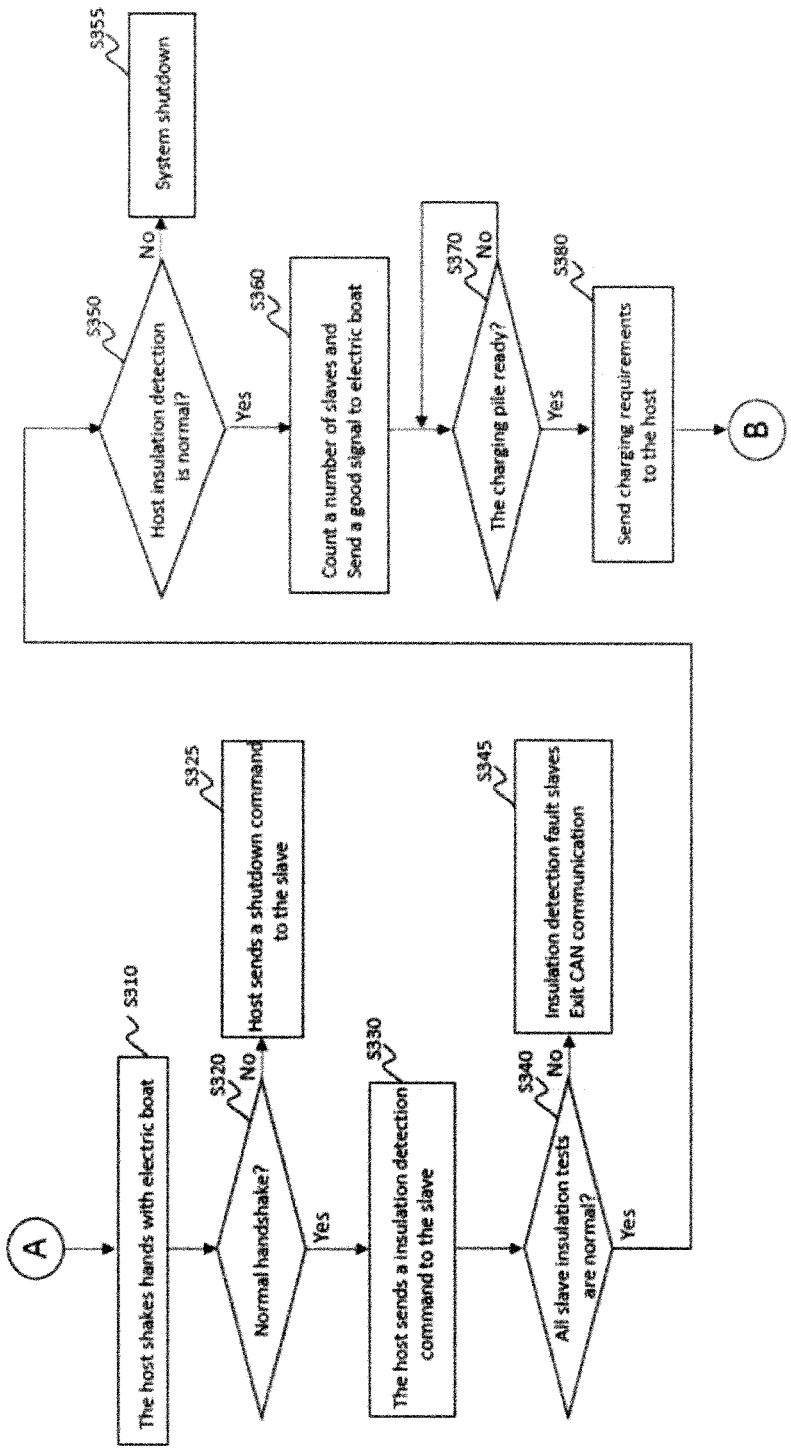
FIG. 3 illustrates a pre-charging logic of the parallel charging of multiple chargers according to some embodiments of the present disclosure.

FIG. 3 illustrates a pre-charging logic for parallel charging using the host 111 and the slave 112 according to some embodiments of the present disclosure. The details will be described with reference to S310 to S380 of FIG. 3.

At S310, the host shake hands with the electric boat 10. At S320, the first controller 111A determines whether the handshake between the host 111 and the electric boat 10 is normal. If the handshake between the host 111 and the electric boat 10 is normal (i.e. 'Yes') at S320, the process proceeds to S330. If the handshake between the host 111 and the electric boat 10 is not normal (i.e. 'No') at S320, the host 111 sends a shutdown command to the slave 112 at S325.

At S330, the first controller 111A controls the host 111 so that the host 111 sends an insulation detection command to the slave 112. At S340, the first controller 111A may determine whether all slave insulation tests are normal. If all slave insulation tests are normal (i.e. 'Yes') at S340, the process proceeds to S350, otherwise the process proceeds to S345. At S345, slaves 112 which failed the insulation detection test exit CAN communication.

At S350, the first controller 111A determines whether the host insulation detection is normal. If the host insulation detection is normal (i.e. 'Yes') at S350, the process moves to S360, otherwise the system is shutdown at S355. At S360, the first controller 111A determines the number of slaves 112 based on the processes shown in FIG. 2 and sends a good signal to the electric boat 10. The good signal may be a signal to indicate that the host is ready to charge the battery of the electric boat 10.

At S370, the first controller 111A determines whether the charging pile is ready to charge. If the charging pile 110 is ready to charge (i.e. 'Yes') at S370, then the process moves to S380, otherwise the step S370 is repeated. At S380, the electric boat 10 sends charging requirements to the host. Upon completion of S380, the process proceeds to S410 or S510.

Figure 4:
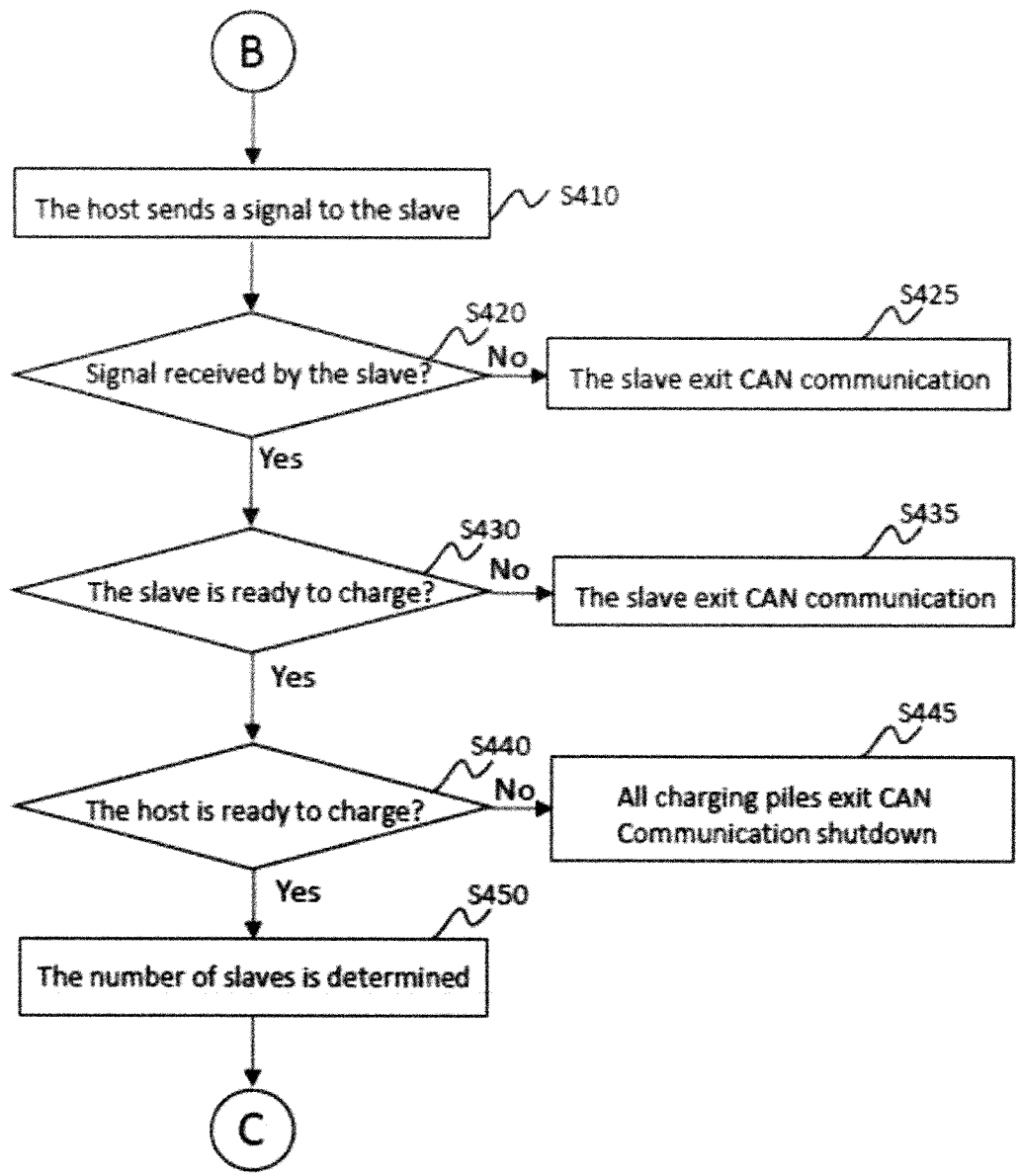
FIG. 4 illustrates an operation logic of master charging pile and at least one slave charging pile according to some embodiments of the present disclosure.

FIG. 4 illustrates an operation logic of the master charging pile 111 and at least one slave charging pile 112 according to some embodiments of the present disclosure. As shown in FIG. 4, the system 1000 performs the processes S410 to S450. At S410, the first controller 111A controls the host 111 so that the host 111 sends a signal to the slave 112.

At S420, the first controller 111A determines whether the signal has been received by the slave 112. If properly received (i.e. 'Yes') at S420, the process proceeds to S430. If not properly received (i.e. 'No') at S420, the first controller 111A controls the slave 112 so that the slave 112 exits CAN communication at S425.

At S430, the first controller 111A determines whether the slave 112 is ready to charge. If the slave 112 is ready to charge (i.e. 'Yes') at S430, the process proceeds to S440.

If the slave 112 is not ready to charge (i.e. 'No') at S430, the first controller 111A controls the slave 112 so that the slave 112 exits CAN communication at S435.

At S440, the first controller 111A determines whether the host 111 is ready to charge. If the host 111 is ready to charge (i.e. 'Yes') at S440, the process proceeds to S450. If the host 111 is not ready to charge (i.e. 'No') at S440, the first controller 111A controls the host 111 so that all charging piles 111, 112 exit CAN communication and shutdown at S445.

At S450, the number of slaves 112 is determined. That is, the first controller 111A determines the number of slaves 112 based on the processes S210 to S240 shown in FIG. 2 and the processes S410 to S440 in FIG. 4. Upon completion of S450, the process proceeds to S510.

Figure 5:
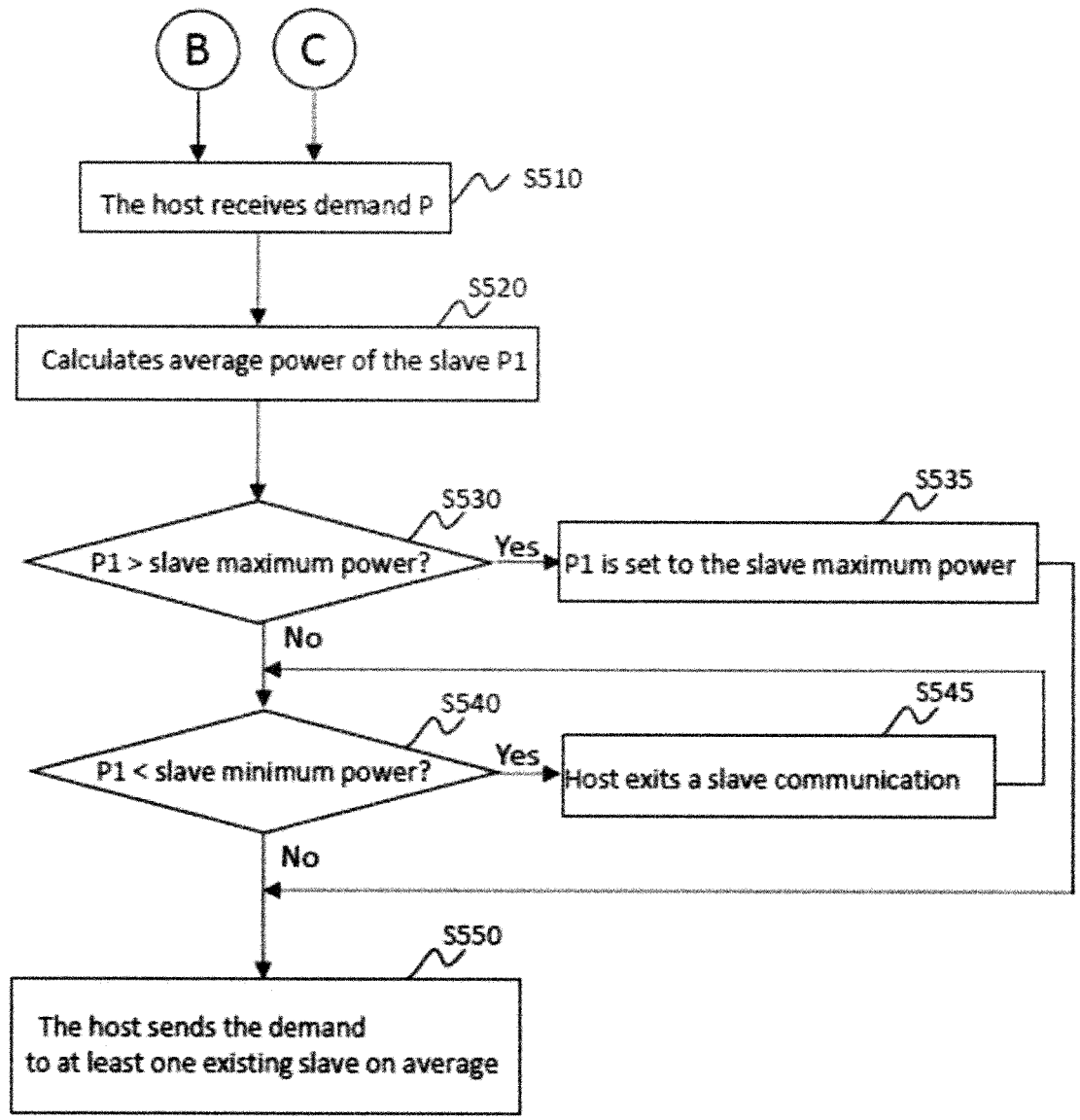
FIG. 5 illustrates a method or process of allocating demand allocating between the chargers arranged in parallel according to some embodiments of the present disclosure.

FIG. 5 illustrates a method or process of allocating demand between the charging piles 111, 112 for charging the electric boat 10 in parallel, according to some embodiments of the present disclosure. The allocation of demand is preferably optimal or near optimal. The process is described with reference to S510 to S550 of FIG. 5. The step S510 may be performed following the step S215 shown in FIG. 2, the step S380 shown in FIG. 3, or the step S450 shown in FIG. 4.

At S510, the host 111 receives a determined demand, P. At S520, the host 111 calculates an average power, P1, based on the number of slaves 112 determined at S210 to S240, S310 to S380, and/or S410 to S450. For example, in the case where the first controller 111A determines that the number of slaves 112 is three in accordance with processes of S210 to S240 and the number of slaves which are ready to charge is two in accordance with processes of S410 to S450, the first controller 111A determines the average power, P1, by dividing the demand P by two.

At S530, the first controller 111A determines whether the average power, P1, is greater than slave maximum power. If the average power, P1, is less than or equal to the slave maximum power (i.e. 'No') at S530, the process proceeds to S540. If the average power, P1, is greater than the slave maximum power (i.e. 'Yes') at S530, the power of the slave is limited to the slave maximum power at S535 and the process proceeds to S550.

At S540, the first controller 111A determines whether the average power, P1, is lower than a slave minimum power. If the average power, P1, is lower than a slave minimum power (i.e. 'Yes') at S540, the host 111 exits a slave communication at S545 and the process returns to S540. If the average power, P1, is not lower than a slave minimum power (i.e. 'No') at S540, the host sends the demand to at least one existing slave on average at S550. The at least one existing slave 112 may be at least one slave 112 which is ready to charge the electric boat 10. It is to be appreciated that the demand, P, and the average power, P1, are not limited to any particular value.

Figure 6:
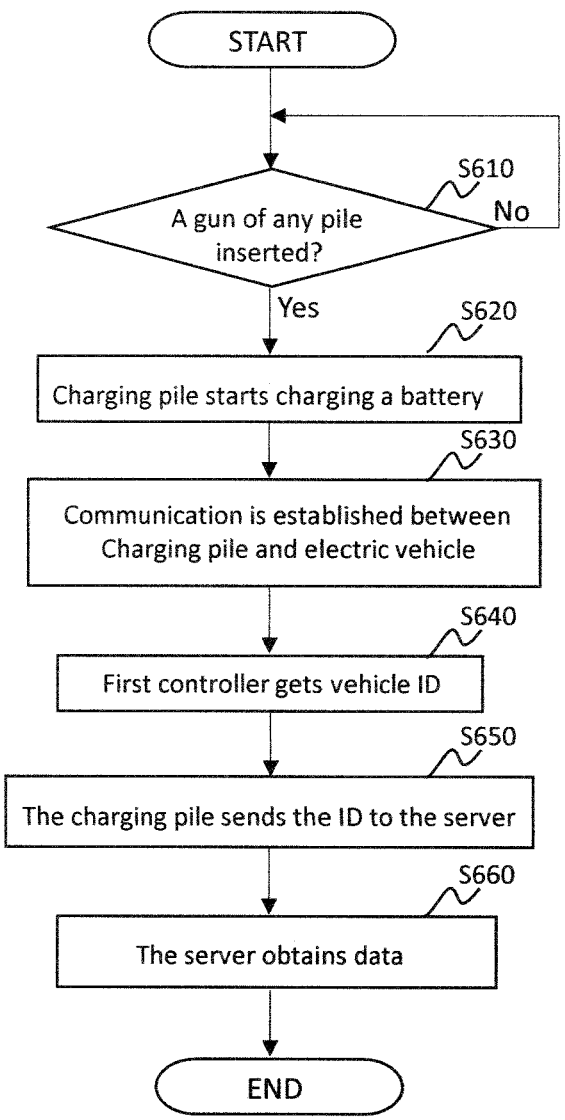
FIG. 6 illustrates a communication in a system 1000 according to some embodiments of the present disclosure.

FIG. 6 illustrates a communication in a system 1000 according to some embodiments of the present disclosure. As shown in FIG. 6, the first controller 111A determines whether the charging member of any charging pile 111, 112 is inserted into a socket 11a, 11b, 12a, 12b of the electric boat 10 at S610. If properly inserted (i.e. 'Yes') at S610, the process proceeds to S620. If not properly inserted (i.e. 'No') at S610, the process loops around S610 until a charging member is determined to have been inserted into a socket 11a, 11b, 12a, 12b of the electric boat 10.

At S620, the apparatus 200 may operate an App, such as a mobile App, to control the first controller 111A so that the charging pile 111 starts to charge a battery of the electric boat 10. For example, by using the App, the apparatus 200 may authenticate a user to determine if the user using the apparatus 200 is an authorized person. It is to be appreciated that in the case where the authentication of the user fails, the charging pile 111, 112 puts charging on hold until an authorized person logs into the apparatus 200.

At S630, the first controller 111A establishes communication between the charging pile 111, 112 and the electric apparatus 100.

At S640, the first controller 111A obtains a vehicle ID of the electric apparatus 100 from the electric apparatus 100 via the communication. The vehicle ID may include, but not limited to, a car manufacturer and/or model information. At S650, the first charging pile 111 sends the vehicle ID to the server 300. At S660, the server 300 receives the data including the vehicle ID from the charging pile 111. The server 300 further obtains data including, but not limited to, charging information, services, fee, required attention, preference, and/or service history associated with the vehicle ID. As such, the server 300 will recognize the EV manufacturer and model of the electric boat 10 and bind this information to the user's account.

Advantageous Effect

According to the present disclosure, only one PLC module is required in the electric boat 10. Thus the cost associated with charging in the electric boat 10 can be drastically reduced if there are many charging sockets 11a, 11b, 12a, 12b. And with communication limited to between the charging pile 111 (the host) and the one single PLC module of the electric boat 10, charging logic and fault handling of a charging station 110 may be simplified. And as a result of that, failure rate of the charging station 110 may be lowered and reliability of the charging station 110 raised.

Furthermore, the first controller 111A is able to determine the number of the at least one charging pile 112 (the slave) configured to charge the battery, by communicating with the second controller 10A via the single PLC module. Such a communication allows the first controller 111A to receive data including a first power from the electric boat 10 that is required to charge a battery and determine a second power based on the number of the at least one second charging piles 112. The second power is used for determining the power each of the at least one second charging piles 112 will deliver during charging of the electric boat 10. As such, the first controller 111A is able to allocate the charging requirements of the electric boat amongst the slaves 112.

According to the present disclosure, communication between the electric boat 10 and the charging pile 111 is achieved using PLC. With PLC, there is no need for extra pins to perform the communication.

Second Embodiment

As shown in the drawings for purposes of illustration, the invention may be embodied in a novel system for charging an electric vehicle that is less complex and more reliable than existing charging systems. Referring to FIG. 1, a system for charging an electric vehicle embodying the invention generally includes multiple charging devices. Each of these charging devices is operable to establish communication with the electric vehicle via a respective charging port of the electric vehicle so as to identify a charging device among the charging devices via which charging requirements of the electric vehicle is to be received and allocated among charging devices that are available for charging the electric vehicle.

Figure 7:
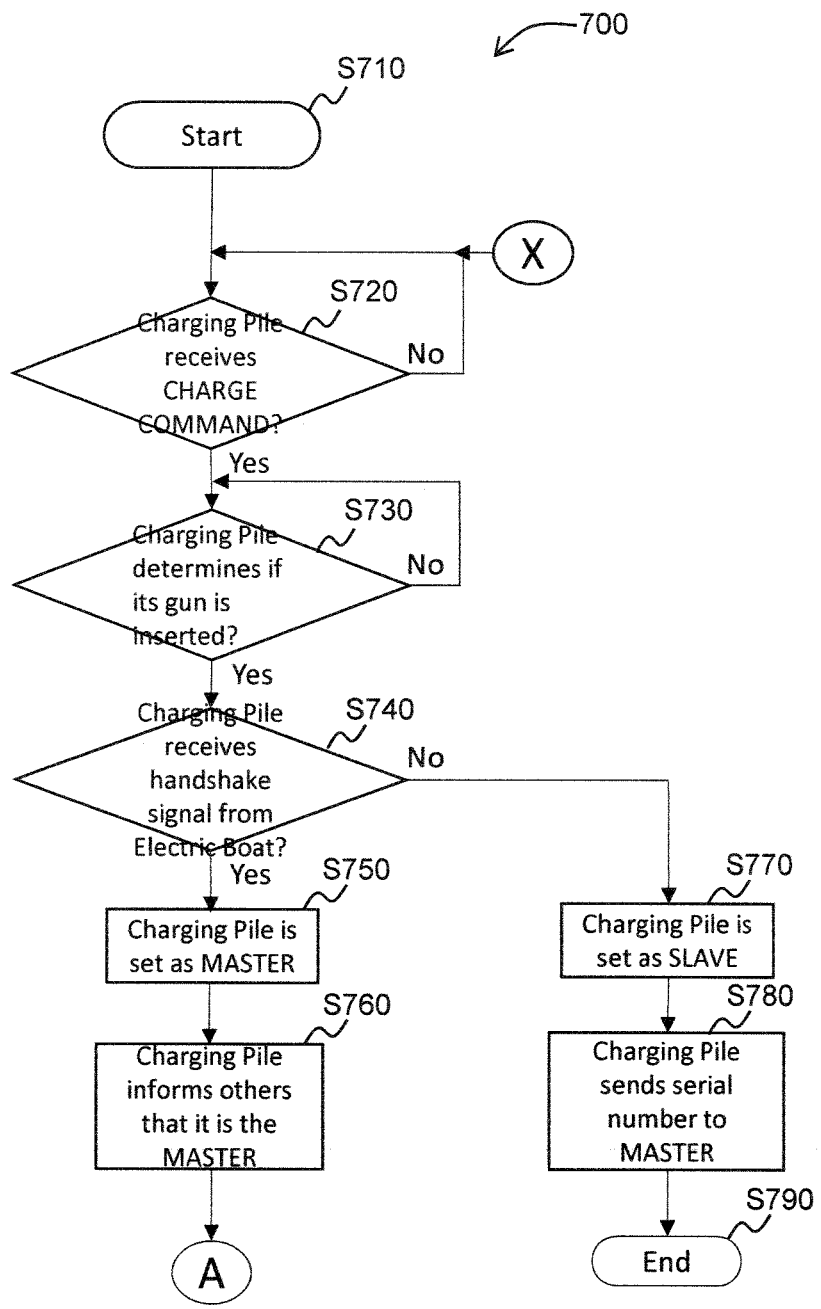
FIG. 7 is a flowchart showing a sequence of steps in each charging pile in FIG. 1 for determining if the charging pile is a master charging pile or a slave charging pile according to an embodiment of the present disclosure.

A method 700 used in the system 1000 will next be described with the aid of the flowcharts shown in FIGS. 7-10. FIG. 7 is a flowchart showing a sequence of steps in each charging pile 111, 112 in FIG. 1 for determining if the charging pile 111, 112 is a master charging pile 111 or a slave charging pile 112 according to an embodiment of the present disclosure. The method 700 starts in a step S710 wherein the system 1000 is initialized. The method next loops around a step S720 wherein each charging pile 111, 112 determines if it has received a CHARGE COMMAND from a user. If a CHARGE COMMAND is received, the method 700 next proceeds to a step S730 wherein each charging pile 111, 112 determines if its charging gun (not shown) has been inserted into a charging port 11a, 11b, 12a, 12b of the electric boat 10. The method 700 loops around the step S730 if the charging pile 111, 112 determines that its charging gun has yet to be inserted into a charging port 11a, 11b, 12a, 12b. If it is determined in the step S730 that the charging gun has been inserted into a charging port 11a, 11b, 12a, 12b of the electric boat 10, the method 700 proceeds to a step S740 wherein the charging pile 111, 112 determines if it has received a handshake signal from the electric boat 10. In other words, the charging pile 111, 112 tries to establish communication with the electric boat 10 by exchanging handshake signals. Handshaking may be initiated by either the charging pile 111, 112 or the electric boat 10. More specifically, handshaking may be initiated by either the SECC 111A, 112A of the charging pile 111, 112 or the EVCC 10A of the electric boat 10. If it is determined that a handshake signal is received by the charging pile 111, 112 after its charging gun has been inserted into a charging port 11a, 11b, 12a, 12b of the electric boat 10, the method 700 proceeds to a step S750 wherein the charging pile 111, 112 is identified as a master charging pile 111, or simply, a master 111. A handshake signal can be received by the charging pile 111, 112 only if the charging port 11a, 11b, 12a, 12b associated therewith is equipped with a PLC module. For example in the system in FIG. 1, only the first charging pile 111 will be able to receive handshake signal from the electric boat 10 to be identified as a master 111 because one of its charging guns is inserted into a charging port 11a, 11b, 12a, 12b of the electric boat that is equipped with a PLC module. As will be described later, the master 111 will receive charging requirements from the electric boat 10 for charging the electric boat 10. The method 700 next proceeds to a step S760 wherein the master 111 informs other charging piles 112 on the CAN that it is a master 111. If however it is determined in the step S740 that no handshake signal is received by the charging pile 111, 112 after its charging gun has been inserted into a charging port 11a, 11b, 12a, 12b of the electric boat 10, the method 700 proceeds to a step S770 wherein the charging pile 111, 112 is identified as a slave charging pile 112 or simply, a slave 112. In the system in FIG. 1, the charging guns of the second charging pile 112 is inserted into a charging port 11a, 11b, 12a, 12b of the electric boat 10 that is not equipped with a PLC module. No handshaking is therefore possible between the second charging pile 112 and the electric boat 10. The second charging pile 112 is therefore identified as a slave 112. From the step S770, the method 700 proceeds to a step S780 wherein the slave 112 sends its charging pile identity (ID), for example, its serial number to the master 111 to indicate to the master 111 that it is available for charging the electric boat 10. The master 111 stores received slave serial numbers in a record, such as a list (not shown). The list therefore includes serial numbers of slaves 112 that are available for charging. The method 700 then ends in a step S790 for the slave 112, wherein each slave 112 waits for and processes commands received from the master 111.

Figure 8:
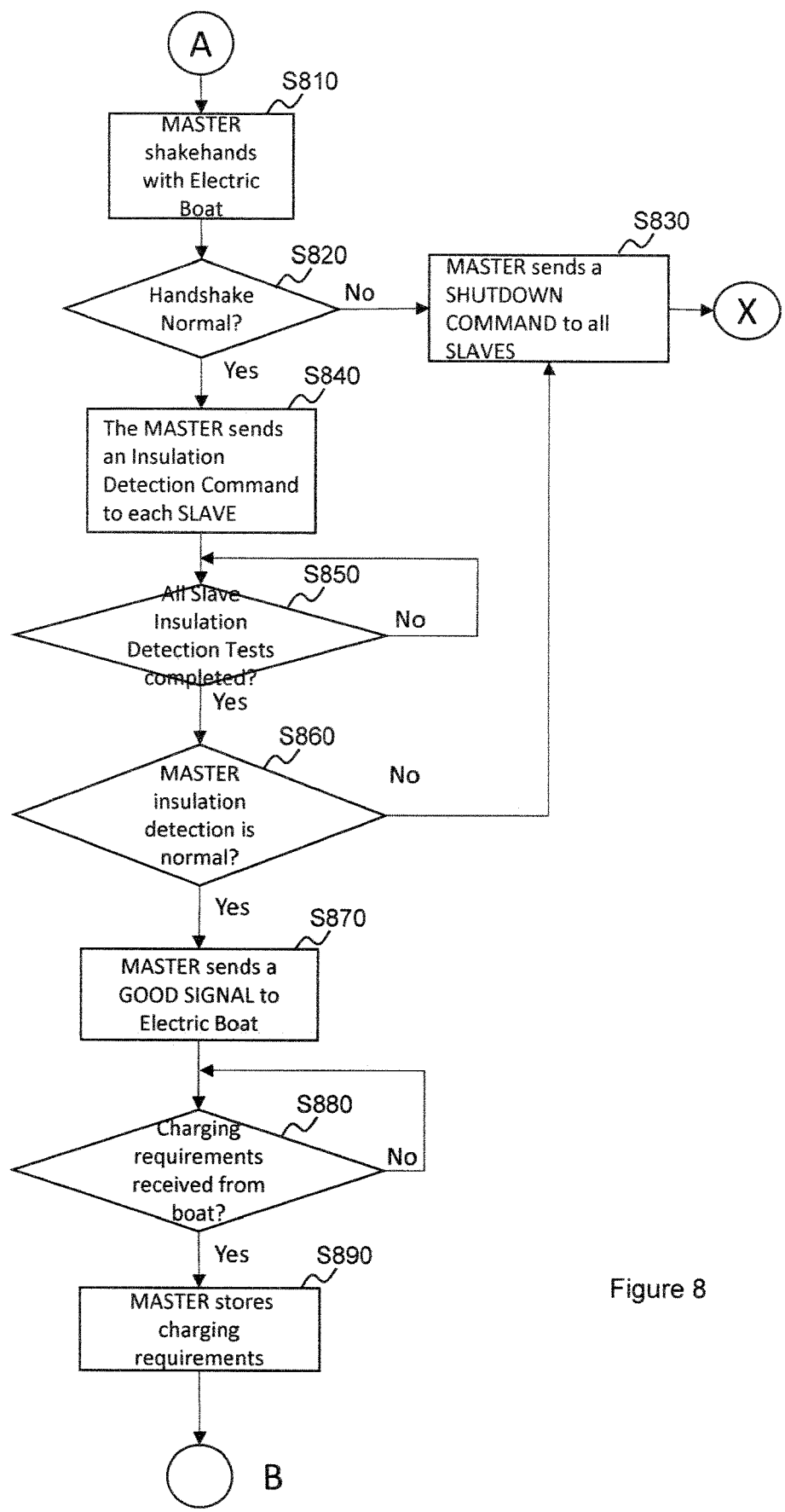
FIG. 8 is a flowchart showing a sequence of steps in a master charging pile for determining if the master charging pile and slave charging piles are available for charging according to an embodiment of the present disclosure.

From the step S760, the method 700 proceeds to a step s810 shown in FIG. 8 wherein the master 111 shakehands once more with the electric boat 10. The method 700 next proceeds to a step S820 wherein the master 111 determines if the handshaking has proceeded normally. For example, handshaking is determined to have proceeded normally if the electric boat 10 acknowledges. If it is determined in the step S820 that handshaking has not proceeded as expected, the master 111 sends a SHUTDOWN COMMAND to all slaves 112 whose IDs are stored in the list maintained by the master 111. Upon receiving this SHUTDOWN COMMAND from the master 111, each slave 112 exits CAN communication and thus the charging operation. If however the master 111 determines in the step S820 that handshaking proceeded normally, the method 700 proceeds to a step S830 wherein the master 111 sends an INSULATION DETECTION COMMAND to each slave 112 in the list to instruct the slave 112 to perform an insulation detection test that is known to those skilled in the art. The method 700 next proceeds to a step S850 wherein the master 111 waits for the slaves 112 to complete the insulation detection test. Upon receiving this INSULATION DETECTION COMMAND from the master 111, each slave 112 will perform the insulation detection test and send a pass/fail result of the test to the master 111. If a fail result is received from a slave 112, the master 111 will remove the slave's serial number from the list. The number of slaves 112 available for charging will be reduced accordingly. Otherwise, the master 111 will keep the slave's serial number in the list.

When all the slaves 112 have reported their test results to the master 111, the method 700 proceeds to a step S860 wherein the master 111 performs its own insulation detection test. If the master 111 fails the insulation detection step, the method 700 proceeds to the step S830 wherein the master 111 sends a SHUTDOWN COMMAND to all slaves 112 still on the list. If it is however determined in the step S860 that the master 111 passes the insulation detection test, the method 700 proceeds to a step S870 where the master 111 sends a GOOD SIGNAL to the electric boat 10 to let the electric boat 10 know that the master 111 is ready for charging. The method 700 next proceeds to a step S880 wherein the master 111 loops around this step S880 waiting for the electric boat 10 to send it its charging demand or overall charging requirements. Those skilled in the art would recognize that charging requirements include voltage and/or current requirements. The master 111 exits this step S880 when it receives the overall charging requirements from the electric boat 10. The method next proceeds to a step S890 wherein the master 111 stores the overall charging requirements received from the electric boat 10 in a memory (not shown) thereof.

Figure 9:
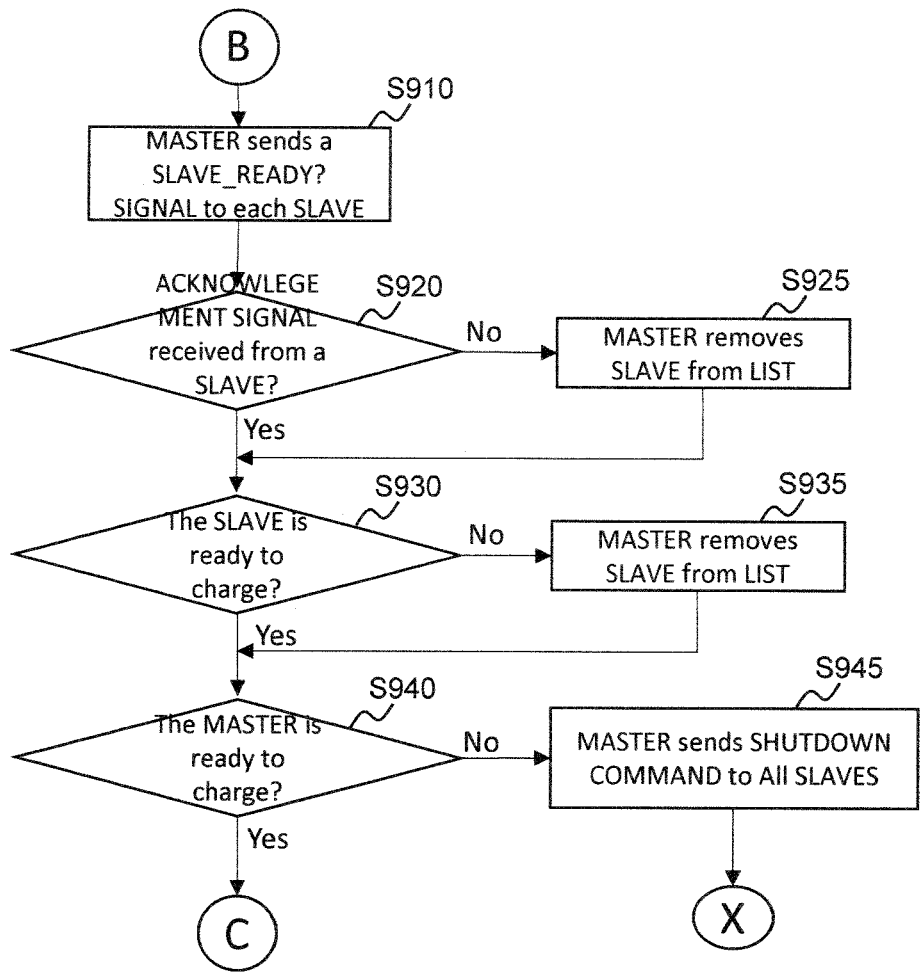
FIG. 9 is a flowchart showing a further sequence of steps in a master charging pile for determining the master charging pile and slave charging piles are available for charging according to an embodiment of the present disclosure.

The method 700 next proceeds to a S910 step as shown in FIG. 9 wherein the master 111 sends a SLAVE READY? SIGNAL to each slave 112 remaining in the list. The method 700 next proceeds to a step S920 wherein the master 111 determines if an ACKNOWLEDGEMENT SIGNAL is received from each of the slaves 112 that were sent the SLAVE READY? SIGNAL. For each slave 112 where no ACKNOWLEDGEMENT SIGNAL is received, the master 111 removes the slave's serial number from the list in a step S925. Slaves 112 that sends ACKNOWLEDGMENT SIGNAL to the master 111 will have their serial numbers kept in the list. The method 700 next proceeds to a step S930 wherein the master 111 determines if each slave 112 still on the list is ready for charging the electric boat 10. If it is determined in this step S930 that a slave 112 is not ready for charging, the master 111 removes the serial number of the slave 112 from the list in a step S935. It is thus possible that the number of slaves 112 available for charging will be further reduced accordingly. If it is determined in this step S930 that a slave 112 is ready for charging, the master 111 leaves the slave's serial number in the list. The method 700 next proceeds to a step S940 wherein the master 111 determines if it is ready for charging. If it is determined in this step S940 that the master 111 is not ready for charging, the method 700 proceeds to a step S950 wherein the master sends a SHUTDOWN COMMAND to each of the slaves 112 remaining in the list to instruct the slaves 112 to abort the charging operation. The method 700 then returns to the step S720 shown in FIG. 2.

Figure 10:
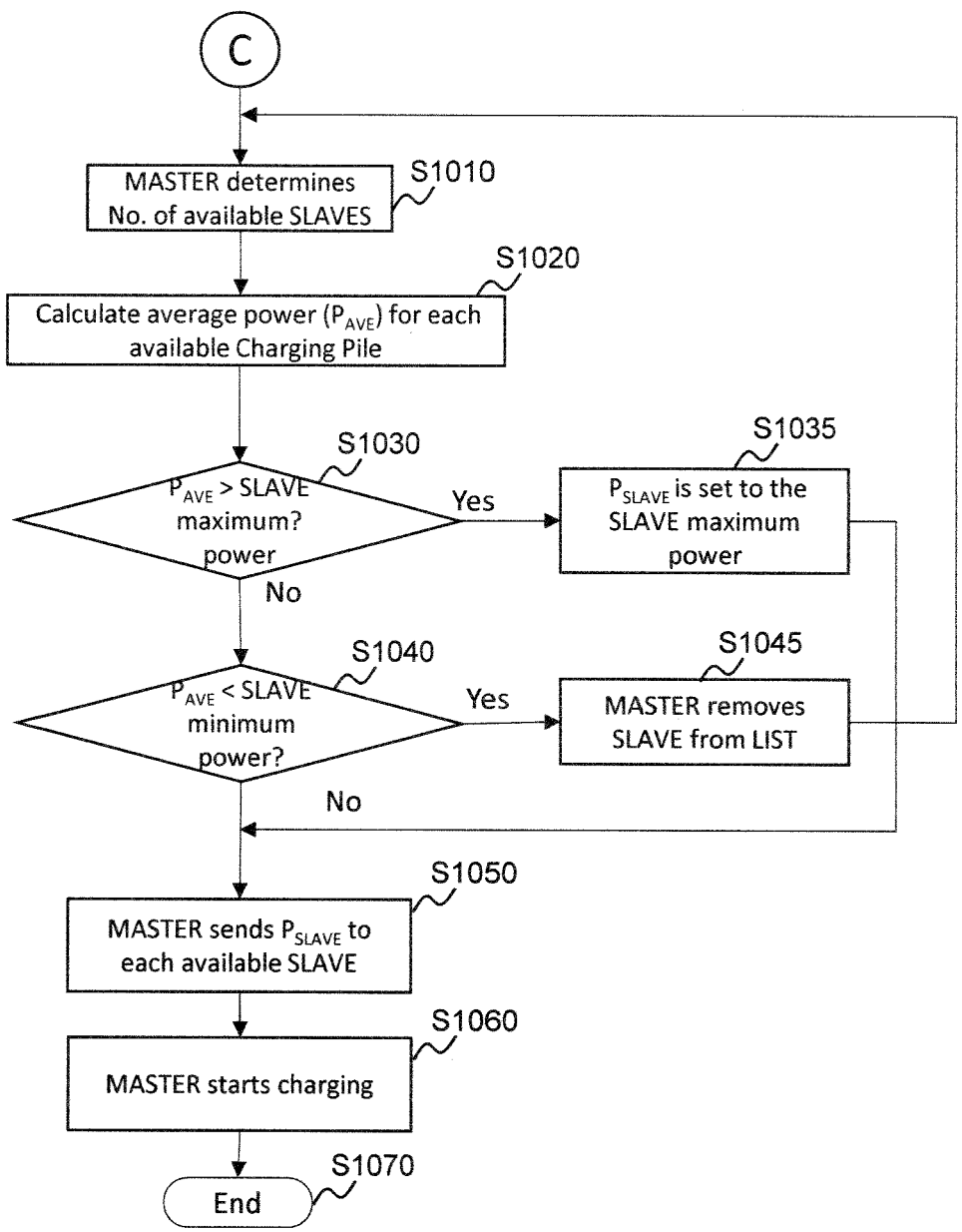
FIG. 10 is a flowchart showing a sequence of steps in a master charging pile for determining charging requirements for each available charging pile according to an embodiment of the present disclosure.

If it is determined in the step S940 that the master 111 is ready for charging, the method 700 proceeds to a step 1010 shown in FIG. 10 wherein the master 111 determines the number of slaves 112 left on the list. It is possible that at this point no slaves have dropped out of charging. In other words, no slaves had their serial numbers removed from the list by the master 111. It is also possible that one or more slaves 112 have dropped out of charging. The method 700 next proceeds to a step S1020 wherein the master 111 calculates average charging requirements for each available charging pile including both master 111 and slaves 112. The master 111 does that by dividing the overall charging requirements received from the electric boat 10 earlier by the number of slaves 112 plus one to account for the master 111 itself. The method 700 next proceeds to a step S1030 wherein the master 111 determines if the average charging requirements exceeds a slave's maximum charging capacity. If it is determined in this step S1030 that the average charging requirements exceeds the slave's maximum charging capacity, charging requirements allocated to the slave 112 is capped at the slave's maximum charging capacity in a step S1035. If it is determined in the step S1030 that the average charging requirements is equal to or less than the slave's maximum charging capacity, the method proceeds to a step S1040 wherein the master 111 determines if the average charging requirements is lower than a slave's minimum charging capacity. If it is determined in this step S1040 that the average charging requirements is lower than the slave's minimum charging capacity, the method 700 proceeds to a step S1045 wherein the master 111 removes the slave 112 for the list. The method 700 then returns to the step S1010 wherein the master 111 repeats the steps S1010 to S1040 to determine new average charging requirements based on a different number of slaves 112 than before. If it is determined in the step S1040 that the average charging requirements is equal to or higher than the slave's minimum charging capacity, the method 700 proceeds to a step S1050 wherein the master 111 sends each slave 112 their respective charging requirements. Upon receiving respective charging requirements from the master 111, each slave 112 will begin charging the electric boat 10. The method then proceeds to a step S1060 wherein the master 111 also starts charging the electric boat 10 based on its allocated charging requirements. The method 700 finally ends in a step S1070 when charging is completed.

Accordingly, the electric boat 10 according to an embodiment of the invention can include a battery (not shown) and multiple charging ports 11a, 11b, 12a, 12b for charging the battery. At least one of these charging ports 11a, 11b, 12a, 12b does not include a PLC module associated therewith for exchanging handshake signals with a charging pile 111, 112. According to the electric boat 10 shown in FIG. 1, only one of the charging ports 11a, 11b, 12a, 12b has a PLC module associated therewith. The electric boat 10 sends its overall charging requirements of the battery to the master charging pile 111 via the charging port 11a having the PLC module associated therewith. The battery is charged with each of the charging ports 11a, 11 b, 12a, 12b receiving a fraction of the overall charging requirements as described above.

Possible Variants

Although the present invention is described as implemented in the above described embodiments, it is not to be construed to be limited as such. For example, it is to be appreciated that communication between the charging pile 111, 112 and the apparatus 200, and communication between the charging pile 111, 112 and the server 300 may use any communication protocol. It is also to be appreciated that wireless communication protocols or standards may include Wireless Fidelity (WiFi) such as IEEE 802.11 a/b/g/n/ax/ba/EHT, Bluetooth, Near Field Communication (NFC), radio frequency identifier (RFID), or cellular communication (e.g., Long Term Evolution (LTE), LTE-Advanced (LTE-A), 5th Generation (5G). And wired communication may be implemented by, for example, using Universal Serial Bus (USB), High Definition Multimedia Interface (HDMI), or Recommended Standard 232 (RS-232).

It is to be appreciated that the first controller 111A and the second controller 10A is hardware implemented but may also be implemented by software in concert with hardware.

In addition, the functional blocks (not shown) used for the hardware are typically implemented as LSI devices, which are integrated circuits. The functional blocks may be formed as individual chips, or a part or all of the functional blocks may be integrated into a single chip.

As another example, although it is described in the embodiments that a charging device is a charging pile 111, 112, it is possible that a charging device may be a connector 111a, 111b, 112a, 112b of a charging pile 111, 112. As a further example, a person skilled in the art would appreciate that not all steps described in FIGS. 7-10 are mandatory; some of the steps may be optional. For example, it may not necessary for the slaves 112 to run the insulation detection test and/or to find out if each slave 112 is ready for charging.

Although the steps are described as being executed in a sequential manner, some of the steps may be executed in parallel. For example, when the slaves 112 run the insulation detection tests, the master 111 may also run its insulation detection test in parallel while waiting for the results of the tests from the slaves 112.

As yet another example, the master 111 receiving the charging requirements from the electric boat 10 is described as determining and allocating charging requirements to the slaves 112. However, those skilled in the art will readily understand that determining and allocating charging requirements may be performed by any slave 112 of the charging station 110, the server 300 or even the apparatus 200.

As a further example, although the invention is described in the context of charging an electric vehicle 100, the invention may be used to charge any electric product that includes a battery.

As yet a further example, although the invention is described with the electric boat 10 having only one single PLC module, the electric boat may have a number of PLC modules that is one less than the number of charging ports 11a, 11b, 12a, 12b. In other words, at least one charging port 11a, 11b, 12a, 12b of the electric boat 10 is not equipped with a PLC module. In such an embodiment, the first charging pile 111, 112 to establish communication with the electric boat 10 will be designated as the master 111.

It is to be appreciated by the person skilled in the art that variations and combinations of features described above, not being alternatives or substitutes, may be combined to form yet further embodiments falling within the intended scope of the disclosure.

As would be understood by a person skilled in the art, each embodiment, may be used in combination with another embodiment or several embodiments.

REFERENCE NUMERALS

10: electric boat
10A: second controller
11a, 11b, 12a, 12b, 13a: socket or port
13: electric car
100: electric apparatus
110: charging apparatus
111: first charging pile (first charging device)
112: second charging pile (second charging device)
113: third charging pile (third charging device)
111A: first controller
111a, 111b, 112a, 112b, 113a: connector
200: apparatus
300: server
1000: system

The invention claimed is:

1. A system for charging an electric vehicle, the system comprising:
a plurality of charging devices;
wherein each of the plurality of charging devices is operable to establish communication with the electric vehicle by exchanging handshake signals therewith via a respective charging port of the electric vehicle for the plurality of charging devices to identify a first charging device among the plurality of charging devices via which charging requirements of the electric vehicle is to be received and allocated among the plurality of charging devices that are available for charging the electric vehicle;

wherein the first charging device is a charging device that successfully exchanges handshake signals with the electric vehicle; and at least one second charging device of the plurality of charging devices that unsuccessfully exchanges handshake signals with the electric vehicle indicates that it is available for charging the electric vehicle.

2. The system for charging an electric vehicle according to claim 1, wherein the at least one second charging device is operable to indicate it is available for charging the electric vehicle by sending a message including its charging device identity (ID) to the first charging device, and wherein the first charging device is operable to maintain a record of charging device IDs that it receives.

3. The system for charging an electric vehicle according to claim 2, wherein charging devices that are available for charging includes charging devices that further pass an insulation detection test.

4. The system for charging an electric vehicle according to claim 3, wherein the first charging device is operable to instruct the at least one second charging device to perform the insulation detection test.

5. The system for charging an electric vehicle according to claim 4, wherein charging devices that are available for charging includes charging devices that are further ready for charging.

6. The system for charging an electric vehicle according to claim 1, wherein
the first charging device is further operable to determine average charging requirements for each charging device that is available for charging.

7. The system for charging an electric vehicle according to claim 6, wherein charging requirements for a charging device is set to a maximum charging capacity associated with the charging device if the average charging requirements exceeds the maximum charging capacity.

8. The system for charging an electric vehicle according to claim 7, wherein a charging device is determined to be no longer available for charging the electric vehicle if the average charging requirements is lower than a minimum charging capacity associated with the charging device, and wherein the first charging device determines a new average charging requirements for charging devices that are still available for charging if any one charging device is determined to be no longer available for charging.

9. A method for charging an electric vehicle via a plurality of charging devices, the method comprising:
each of the plurality of charging devices establishing communication with the electric vehicle via a respective charging port of the electric vehicle;
identifying, by the plurality of charging devices, a first charging device among the plurality of charging devices that successfully establishes communication with the electric vehide for receiving charging requirements of the electric vehicle;
receiving charging requirements of the electric vehicle via the first charging device;
allocating the charging requirements among charging devices that are available for charging; and
charging the electric vehicle via the charging devices that are available for charging based on respective allocated charging requirements;
wherein each charging device that unsuccessfully establishes communication with the electric vehicle indicates that it is available for charging the electric vehicle.

10. The method for charging an electric vehide according to claim 9, wherein establishing communication comprises exchanging handshake signals.

11. The method for charging an electric vehicle according to claim 9, wherein charging devices that are available for charging includes charging devices that further pass an insulation detection test.

12. The method for charging an electric vehide according to claim 9, wherein charging devices that are available for charging includes charging devices that are further ready for charging.

13. The method for charging an electric vehicle according to claim 9, wherein allocating the charging requirements among the plurality of charging devices that are available for charging includes:
determining average charging requirements for each charging device that is available for charging.

14. The method for charging an electric vehide according to claim 13, wherein charging requirements for a charging device is set to a maximum charging capacity associated with the charging device if the average charging requirements exceeds the maximum charging capacity.

15. The method for charging an electric vehicle according to claim 14, wherein a charging device is determined to be no longer available for charging the electric vehicle if the average charging requirements is lower than a minimum charging capacity associated with the charging device, and the method further including determining new average charging requirements for charging devices that are still available for charging if any one charging device is determined to be no longer avai6able for charging.

16. An electric vehicle comprising:
a battery;
a first charging port for charging the battery, the first charging port including a communication module for exchanging handshake signals with a first charging device of a charging system when connected thereto; and
at least one additional charging port that does not include a communication module associated therewith for exchanging handshake signals with at least one corresponding additional charging device of the charging system when connected thereto, the at least one corresponding additional charging device configured to be in data communication with the first charging device and to indicate that it is available for charging;
wherein the electric vehicle is operable to send charging requirements of the electric vehicle to the charging system via the first charging device, and the charging system is operable to allocate the charging requirements among the first charging device and the at least one corresponding additional charging device.

17. The electric vehicle according to claim 16, wherein the first charging port is the only charging port of the electric vehicle with a communication module.

18. The electric vehicle according to claim 17, wherein the battery is configured to be chargeable with each of the first charging port and the at least one additional charging port receiving a fraction of the charging requirements.

19. The electric vehicle according to claim 16, wherein the communication module is a power line communication, PLC, communication module.

* * * * *